May 16, 1961 W. A. KATES 2,984,261
FLUID FLOW REGULATOR
Filed April 16, 1958

INVENTOR:
WILLARD A. KATES
BY
Schroeder, Hofgren, Brady & Wegner
ATT'YS

United States Patent Office 2,984,261
Patented May 16, 1961

2,984,261

FLUID FLOW REGULATOR

Willard A. Kates, Deerfield, Ill., assignor to The W. A. Kates Company, a corporation of Illinois Filed Apr. 16, 1958, Ser. No. 728,988

6 Claims. (Cl. 138—46)

This invention relates to a flow control device and more particularly to a flow regulating valve operable to maintain a desired constant volume of flow regardless of changes in the pressure of the fluid being controlled.

It is the general object of the present invention to produce a new and improved control device of the character described.

It is a more specific object of the invention to produce a flow control device having a port and valving means controlling the ports with the valving means being operable to control the area of the ports through which fluid may flow in accordance with changes in fluid pressure so that the volume of flow through the ports is substantially constant.

While it will become apparent to those skilled in the art that the fluid flow control device of the present invention has many applications, it is particularly useful and its characteristics make it admirably suited for use as a liquid flow control in machines or other apparatus which handle liquids containing a gas in solution, such as for example, carbonated beverages. Liquids of the nature just described present a somewhat different problem as regards the regulation of their flow than is presented by what might be termed as normal liquids. Thus, in the example cited where the liquid is a carbonated beverage, sudden decreases in pressure or abrupt changes in velocity or direction will often cause foaming, that is, will cause the carbon dioxide to come out of solution and thus spoil or seriously impair the acceptability of the product.

In accordance with the present invention, however, there is provided a flow control valve which will not only effectively produce a desired flow regardless of changes in pressure upstream of the valve, but also is constructed so as to reduce to a minimum the occurrence of foaming in the product being regulated. This is accomplished in part by providing a construction wherein sudden decreases in pressure or rapid changes in velocity of the fluid are avoided.

Thus, it is yet another object of the invention to produce a fluid flow regulating valve particularly adapted for use in handling carbonated beverages or liquids with similar properties.

Figure 1:
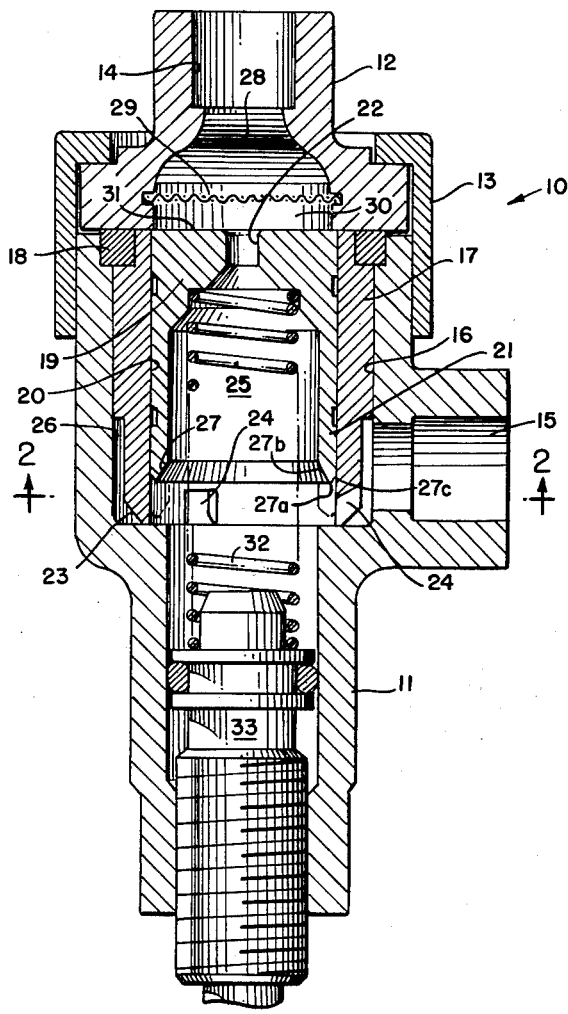
Figure 2:
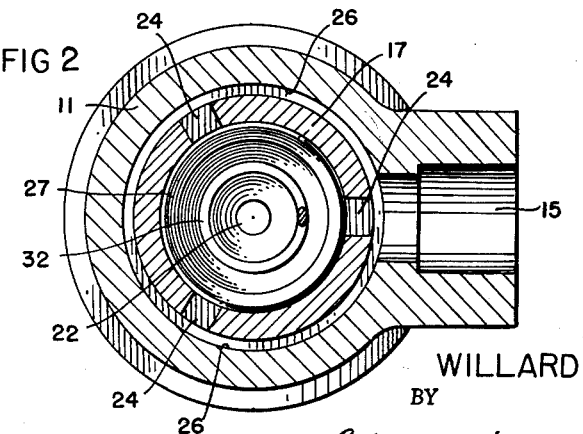

Other and further advantages and objects of the invention will be readily apparent from the following description and drawings, in which:

Fig. 1 is a longitudinal section through a flow regulating valve constructed in accordance with the principles of the present invention; and Fig. 2 is a sectional view along the line 2—2 of Fig. 1.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, the flow regulating valve 10 includes a casing having a main body portion 11 provided with a cap portion 12 secured to the main body portion by means of a fitting 13, with the cap portion being provided with an inlet 14 and with the main body portion being provided with an outlet 15. The main body portion is constructed so as to provide for a cylindrical chamber 16 in which a sleeve 17 is fitted, with the sleeve being maintained in fluid-tight relationship to the main body portion by means of the seal 18. A piston 19 is reciprocable within the cylinder 20 provided by the interior surface of the sleeve with the piston being provided with the usual piston skirt 21 and being further provided with an orifice 22 at its upper end.

The sleeve 17 is provided with a beveled lower edge indicated at 23 and formed in the edge and spaced around the sleeve is a plurality of ports 24. It will be noted that not only is the lower edge of the sleeve 23 angled away from the axis of the cylinder 20 but that the ports 24 are similarly angled so as to provide between the hollow interior 25 of the piston and an annular chamber 26 surrounding the lower portion of the sleeve, passageways which widen in the downstream direction thereby producing a reduction in the speed of fluid flow after the fluid enters the ports 24.

In addition, the annular chamber 26 which surrounds and communicates with the ports 24 and also with the outlet 15 is of restricted volume as compared with the volume, for example, of the outlet 15. Thus the pressure drop from within the piston 25 to within the outlet 15 is gradual, occurring downstream of the ports 24, but because of their configuration and because of the presence of the restricted chamber 26, the total pressure drop is spread throughout the ports and chamber rather than occurring at a single point.

It will be noted that the lower edge 27 of the skirt 21 of the piston is shaped so as to have an annular tip portion 27a of small radius of curvature intermediate the inner and outer surfaces of the piston. Preferably, the angle of the bevel 27b from the inner surface of the piston to the point of small radius of curvature is less than 45° relative to the axis of the cylinder 20. As seen in Fig. 1, the edge 27 further includes an outer bevel 27c extending from tip 27a to the outer surface of the piston. Thus, even within the confines of the cylinder 20 below the lower edge of the piston 19, the downstream widening of the fluid passageway hereinabove referred to also is present.

In operation, fluid entering the inlet 14 passes into an inlet chamber 28 and through a filter screen 29 to enter the area 30 below the filter screen but above the upper face 31 of the piston. Fluid then flows through the orifice 22 into the chamber 25 and because of the pressure drop across the orifice 12 a force is exerted upon the piston 19 tending to move it downwardly as shown in the drawings, thereby to bring the lower edge of the skirt 21 across the ports 24 as shown in dotted lines in Fig. 1. Such movement of the piston is resisted by means of a compression spring 32 extending between an adjusting member 33 threaded into the lower portion of the main valve body and against the interior of the piston 19.

Movement of the piston in the manner just described, of course, throttles the ports 24 reducing the total flow through the valve until the pressure drop across the orifice 22 is offset by the bias of the spring 32. Any changes in upstream pressure will cause corresponding movement of the piston so as to maintain the flow through the outlet 15 at a constant predetermined value regardless of such changes in inlet pressure.

Because of the features of construction discussed and illustrated, there has been provided a flow regulating valve which not only will maintain its desired operating characteristics over relatively wide fluid pressure variations and will be stable up to pressure as high as 125 p.s.i. but, in addition, one which is capable of handling liquids containing gas in solution without creating the turbulence or other shock to the liquid which would cause the gas to tend to come out of solution. The device is relatively simple in construction and many of the parts can be made of plastic thereby economizing on construction while retaining the advantages present in the invention.

I claim:

1. A fluid flow regulating device comprising a casing having an inlet and outlet and a fluid passage interconnecting the inlet and outlet; a port in the casing forming a portion of said passage; a piston reciprocably mounted in the casing and having a skirt portion, the edge of which controls the port, said edge having an annular tip portion of small radius intermediate the inner and outer surfaces of the skirt and a frusto-conical surface extending outwardly from said annular tip providing an outwardly widening passage leading to said port, said piston having an orifice therein through which fluid entering the inlet flows to the outlet with the fluid flow through said orifice creating a pressure differential on opposite sides of the orifice to urge the piston toward movement in the direction closing the port; and means biasing the piston toward movement in the opposite direction.

2. A fluid flow regulating device comprising a casing having an inlet and outlet and a fluid passage interconnecting the inlet and outlet; a port in the casing forming a portion of said passage; a piston reciprocably mounted in the casing and having a skirt portion, the edge of which controls the port, said edge having an inner portion extending from the inner surface of the skirt and beveled to form an angle of less than 45° relative to the axis of the piston providing a widening passage in said piston, and an outer portion extending from said inner portion and bevelled generally oppositely to said inner portion to provide a widening passage to said port, said piston having an orifice therein through which fluid entering the inlet flows to the outlet with the fluid flow through said orifice creating a pressure differential on opposite sides of the orifice to urge the piston toward movement in the direction closing the port; and means biasing the piston toward movement in the opposite direction.

3. A fluid flow regulating device comprising a casing having an inlet and an outlet; a sleeve fixed in the casing and defining a cylinder therewithin communicating at one end with the inlet; a piston reciprocably mounted in the cylinder and having a skirt portion thereon, there being an annular space between the sleeve and the casing forming a restricted chamber communicating with the outlet; said sleeve having a port opening between the cylinder and the chamber and positioned substantially circumferentially from said outlet to be controlled by the edge of the skirt, said piston having an orifice therein through which fluid entering the inlet flows to the outlet with the fluid flow through said orifice creating a pressure differential on opposite sides of the orifice to urge the piston toward movement in a direction closing the port, and means biasing the piston toward movement in the opposite direction.

4. A fluid flow regulating device comprising a casing having an inlet and an outlet; a sleeve fixed in the casing and defining a cylinder therewithin communicating at one end with the inlet and at its other end with the outlet; a piston reciprocably mounted in the cylinder and having a skirt portion thereon, there being a space between the sleeve and the casing forming an annular restricted chamber communicating with the outlet; a plurality of spaced ports in the sleeve opening between the cylinder and the chamber and positioned to be controlled by the edge of the skirt, at least one of said ports being spaced substantially circumferentially from said outlet, said piston having an orifice therein through which fluid entering the inlet flows to the outlet with the fluid flow through said orifice creating a pressure differential on opposite sides of the orifice to urge the piston toward movement in a direction closing the ports, and means biasing the piston toward movement in the opposite direction.

5. A fluid flow regulating device comprising a casing having an inlet and an outlet; a sleeve fixed in the casing and defining a cylinder therewithin communicating at one end with the inlet and at its other end with the outlet; a piston reciprocably mounted in the cylinder and having a skirt portion thereon, there being a space between the sleeve and the casing forming an annular restricted chamber communicating with the outlet; a plurality of spaced ports in the sleeve opening between the cylinder and the chamber and positioned to be controlled by the edge of the skirt, each of said ports having a cross-sectional area increasing from the inner surface of the cylinder to the chamber, said piston having an orifice therein through which fluid entering the inlet flows to the outlet with the fluid flow through said orifice creating a pressure differential on opposite sides of the orifice to urge the piston toward movement in a direction closing the ports, and means biasing the piston toward movement in the opposite direction.

6. A fluid flow regulating device comprising a casing having an inlet and an outlet; a sleeve fixed in the casing and defining a cylinder therewithin communicating at one end with the inlet and having a port at its other end communicating with the outlet; a piston reciprocably mounted in the cylinder and having a skirt portion thereon the edge of which controls the port, said edge having a portion of small radius intermediate the inner and outer surfaces of the skirt, there being a space between the sleeve and the casing forming an annular restricted chamber communicating with the outlet, said edge further having a beveled portion extending outwardly from said portion of small radius defining a passage widening to said chamber; a plurality of spaced ports in the sleeve opening between the cylinder and the chamber and positioned to be controlled by the edge of the skirt, each of said ports having a cross-sectional area increasing from the cylinder to the chamber and at least one of said ports being spaced substantially circumferentially from said outlet, said piston having an orifice therein through which fluid entering the inlet flows to the outlet with the fluid flow through said orifice creating a pressure differential on opposite sides of the orifice to urge the piston toward movement in a direction closing the ports, and means biasing the piston toward movement in the opposite direction.

References Cited in the file of this patent

UNITED STATES PATENTS

| | | |
|---|---|---|
| 2,179,144 | Buttner | Nov. 7, 1939 |
| 2,655,173 | Overbeke | Oct. 13, 1953 |
| 2,699,799 | Wager | Jan. 18, 1955 |
| 2,819,799 | Wilkerson | Jan. 14, 1958 |

FOREIGN PATENTS

| | | |
|---|---|---|
| 9,895 | France | Dec. 22, 1908 |
| 465,831 | Canada | Dec. 22, 1908 |
| 1,149,269 | France | July 8, 1957 |